(12) United States Patent  
Kato et al.

(10) Patent No.: US 9,158,068 B2
(45) Date of Patent: Oct. 13, 2015

(54) WIDE PASSBAND AWG

(75) Inventors: Masaki Kato, Palo Alto, CA (US); Radhakrishnan L. Nagarajan, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 930 days.

(21) Appl. No.: 13/177,363

(22) Filed: Jul. 6, 2011

(65) Prior Publication Data

US 2013/0011098 A1 Jan. 10, 2013

(51) Int. Cl.
*G02B 6/34* (2006.01)
*G02B 6/12* (2006.01)

(52) U.S. Cl.
CPC .................... *G02B 6/12011* (2013.01)

(58) Field of Classification Search
CPC .................................................. G02B 6/12009
See application file for complete search history.

(56) References Cited

U.S. PATENT DOCUMENTS

| | | | | |
|---|---|---|---|---|
| 5,978,532 | A * | 11/1999 | Rigny et al. | 385/46 |
| 6,307,991 | B1 * | 10/2001 | Nolan | 385/50 |
| 6,477,294 | B1 * | 11/2002 | Van Doorn et al. | 385/24 |
| 7,403,682 | B1 * | 7/2008 | Doerr | 385/37 |
| 2002/0001432 | A1 * | 1/2002 | Ueda | 385/37 |
| 2002/0057875 | A1 * | 5/2002 | Kaneko | 385/37 |
| 2004/0202419 | A1 * | 10/2004 | Ho et al. | 385/37 |
| 2005/0047722 | A1 * | 3/2005 | Bhowmik et al. | 385/42 |
| 2005/0053332 | A1 * | 3/2005 | Doerr | 385/37 |
| 2008/0031570 | A1 * | 2/2008 | Fondeur et al. | 385/18 |
| 2009/0116789 | A1 * | 5/2009 | Doerr | 385/37 |
| 2009/0185806 | A1 * | 7/2009 | Das et al. | 398/68 |
| 2013/0011098 | A1 * | 1/2013 | Kato et al. | 385/37 |

* cited by examiner

*Primary Examiner* — Tina Wong
(74) *Attorney, Agent, or Firm* — David L. Soltz (57) ABSTRACT

Consistent with the present disclosure, an AWG is provided that has grating waveguide groupings that extend between a first free space region and a second free space region. The difference in length (ΔL) between successive grating waveguides differs for each grouping of grating waveguides, such that, for example, the ΔL associated with a given grating waveguide grouping is not an integer multiple of any of the other grating waveguide groupings. The grating waveguide groupings direct images having relatively small wavelength differences to a given output waveguide, and each grating waveguide grouping has an associated passband, which is similar to that of the conventional AWG. Unlike the conventional AWG, however, multiple grating waveguide groupings are included in the same AWG, such that the spectra associated with the grating waveguide groupings combine to provide a transmission characteristic having a passband that is greater than any individual passband. Accordingly, even if the optical signal wavelengths vary or are offset from the center wavelength of the passband, such wavelengths may still be transmitted with less loss.

21 Claims, 11 Drawing Sheets

WIDE PASSBAND AWG

BACKGROUND

An Arrayed Waveguide Grating (AWG) is a device commonly used as a frequency or wavelength optical demultiplexer and can be considered as a spatially dispersive lens. For example, an image received at an input of the AWG will be projected onto an output plane similar to a conventional lens, but the position of the output image on the output plane is wavelength dependent. Accordingly, the position of the output image may change as the wavelength of the input image changes, or as the input position of the input image changes.

Figure 10:
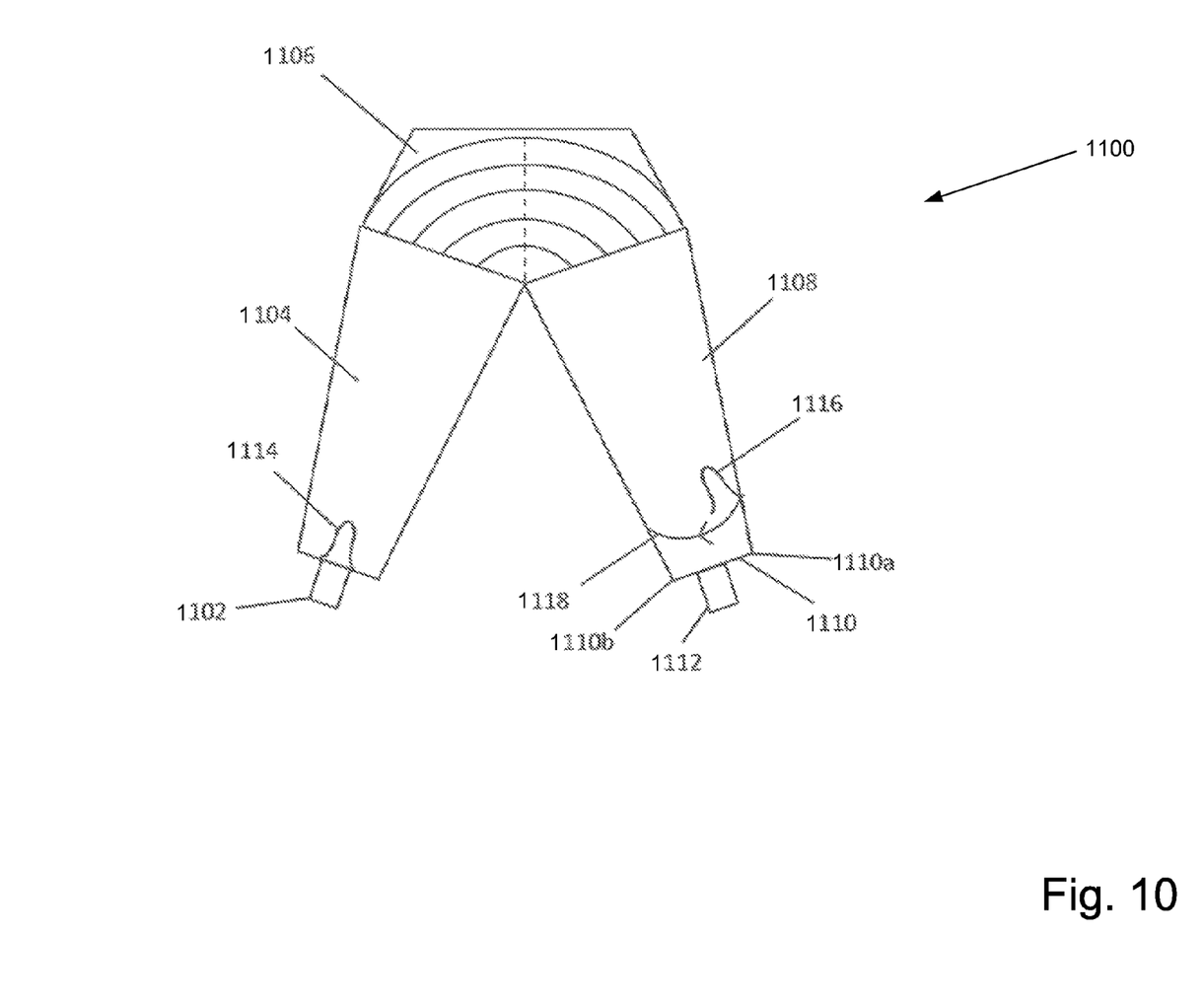
FIG. 10 illustrates a conventional AWG.

FIG. 10 illustrates components of a conventional AWG 1100. As shown in FIG. 10, an input image 1114 may be projected from an input waveguide 1102 into an input free-space propagation region 1104, and the image may expand, or diffract, within the input free-space propagation region 1104. A waveguide array 1106 may be disposed at an opposite end of the input free-space propagation region 1104 to collect the expanded image. Waveguide array 1106 comprises a series of quasi-parallel waveguides where the length of each waveguide increases by a constant and specified amount from an adjacent waveguide. That is, starting from the innermost shortest waveguide, each subsequent waveguide increases in length by a specified amount.

The collected image is received by the waveguide array 1106 and projected into an output free-space propagation region 1108. The image output from waveguide array 1106 propagates through the output free-space propagation region 1108 onto the output image plane 1110 containing output waveguide 1112. As generally understood, due to phase curvature and phase tilt of light propagating through waveguide array 1106, the image may be refocused on to an output image plane 1110. The output image 1116 is initially received at the right side 1110a in FIG. 10 of the output image plane 1110 and scans from the right side 1110a to the left side 1110b as indicated by arrow 1118, as the wavelength changes. Put another way, the position of the output image 1116 on the output image plane 1110 may change as a function of wavelength, and the change in the location of the image 1116 across the output image plane 1110 of the AWG 1100 is generally referred to as the scanning property of the AWG.

The output waveguide 1112 collects the image as it scans across the output image plane 1110. Typically, the input waveguide 1102 and the output waveguide 1112 have the same dimensions such that, in an ideal AWG, the output image will substantially match a mode profile of the output waveguide. Accordingly, when the output image 1116 is centered on an output waveguide, the transmission response from input to output is nearly 100% (i.e. unity). Because the position of the output image 1116 changes with frequency, multiple output waveguides 1112 may be provided to collect light at different frequencies, such that, in one example, AWG 1100 may function as an optical demultiplexer. Output waveguide 1112 collects the maximum amount of energy at a predetermined frequency or wavelength, whereby the output image 1116 is centered on output waveguide 1112. The amount of energy collected by an output waveguide 1112 is reduced as the frequency of the output image 1116 varies from the center frequency of the output waveguide 1112. That is, a passband associated with output waveguide 1112 is relatively narrow such that optical signals at wavelengths that are shifted from a peak transmission wavelength or center wavelength of the passband may incur substantial loss.

Optical signals supplied to the AWG may have varying wavelengths or wavelengths that are offset from the predetermined wavelength at which the output image 1116 would be centered on output waveguide 1112 due to system tolerances and non-idealities. Accordingly, such signal my incur loss during propagation through the AWG. Moreover, the passband or full-width half maximum (FWHM) associated with output waveguide 1112 is typically 40%-50% of a wavelength spacing separating the optical signal wavelengths. Thus, in systems in which the optical signal wavelengths are narrowly spaced, minor deviations in optical signal wavelengths can result in loss, as the optical signals pass through the AWG.

Accordingly, there is a need for an AWG that can multiplex/demultiplex optical signals with reduced loss, even when the optical signal wavelengths are offset from a center wavelength of an AWG passband.

SUMMARY

Consistent with an aspect of the present disclosure, an arrayed waveguide grating (AWG) is provided that includes a first free space region and a second free space region spaced from the first free space region. The first free space region is configured to receive light having a wavelength, and the second free space region has an edge portion. The AWG has a first plurality of waveguides extending from the first free space region to the second free space region. Each of the first plurality of waveguides having a corresponding one of a plurality of first lengths L1, L2, L3 ... Ln, where n is a number of the first plurality of waveguides, ΔL being a difference between first and second successive ones of the plurality of first lengths. The AWG also has a second plurality of waveguides extending from the first free space region to the second free space region. Each of the second plurality of waveguides has a corresponding one of a plurality of second lengths L1', L2', L3' ... Lm', where m is a number of the second plurality of waveguides, ΔL' being a difference between first and second successive ones of the plurality of second lengths. In addition, the AWG has a third plurality of waveguides extending from the first free space region to the second free space region. Each of the third plurality of waveguides has a corresponding one of a plurality of third lengths L1", L2", L3" ... Lp", where p is a number of the third plurality of waveguides, ΔL" being a difference between first and second successive ones of the plurality of second lengths. Further, the first plurality of waveguides and the first and second free space regions are configured such that a first portion of the light is projected on a first part of the edge portion of the second free space region. Also, the second plurality of waveguides and the first and second free space regions are configured such that a second portion of the light is projected onto a second part of the edge portion, and the third plurality of waveguides and the first and second free space regions are configured such that a third portion of the light is projected onto a third part of the edge portion. The first, second, and third parts of the edge portion overlap one another.

Consistent with a further aspect of the present disclosure a plurality of optical transmitters are provided. Each of the plurality of optical transmitters supplies a corresponding one of the plurality of optical signals.

Consistent with an additional aspect of the present disclosure, an apparatus is provided that includes an input waveguide configured to carry a plurality of optical signals, each of which having a corresponding one of a plurality of wavelengths. Each of the plurality of wavelengths is spectrally spaced from one another by a wavelength spacing. First and second free space regions are provided which are spaced from one another. The first free space region is configured to receive the plurality of optical signals. A first plurality of grating waveguides extend from the first free space region to the second free space region, and a second plurality of grating waveguides extend from the first free space region to the second free space region. Further, a third plurality of grating waveguides extend from the first free space region to the second free space region. Also, a plurality of output waveguides is provided. Each of the plurality of output waveguides provides a corresponding one of the plurality of optical signals, and each of the plurality of output waveguides extends from a corresponding one of a plurality of portions of an edge portion of the second free space region. The first, second, and third pluralities of grating waveguides being associated with first, second, and third transmission maxima, respectively. The first, second, and third transmission maxima being associated first, second, and third wavelengths, respectively. The first and second wavelengths are spaced from each other by a first spectral distance, and the second and third wavelengths are spaced from each other by a second spectral distance. The first and second spectral distances are less than the wavelength spacing.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure.

DESCRIPTION OF THE EMBODIMENTS

Consistent with the present disclosure, an AWG is provided that has grating waveguide groupings that extend between a first free space region and a second free space region. The difference in length ($\Delta L$) between successive grating waveguides differs for each grouping of grating waveguides, such that, for example, the $\Delta L$ associated with a given grating waveguide grouping is not an integer multiple of any of the other grating waveguide groupings. The grating waveguide groupings direct images having relatively small wavelength differences to a given output waveguide, and each grating waveguide grouping has an associated passband, which is similar to that of the conventional AWG. Unlike the conventional AWG, however, multiple grating waveguide groupings are included in the same AWG, such that the spectra associated with the grating waveguide groupings combine to provide a transmission characteristic having a passband that is greater than any individual passband. Accordingly, even if the optical signal wavelengths vary or are offset from the center wavelength of the passband, such wavelengths may still be transmitted with less loss. In one example, the grating waveguides of at least three groupings are uniformly distributed or "interleaved" between the first and second free space regions, such that grating waveguides of the first and second groupings, for example, are provided between pairs of gratings associated with the third grouping. In another example, each grating waveguide grouping extends between corresponding contiguous regions of the first and second free space regions.

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
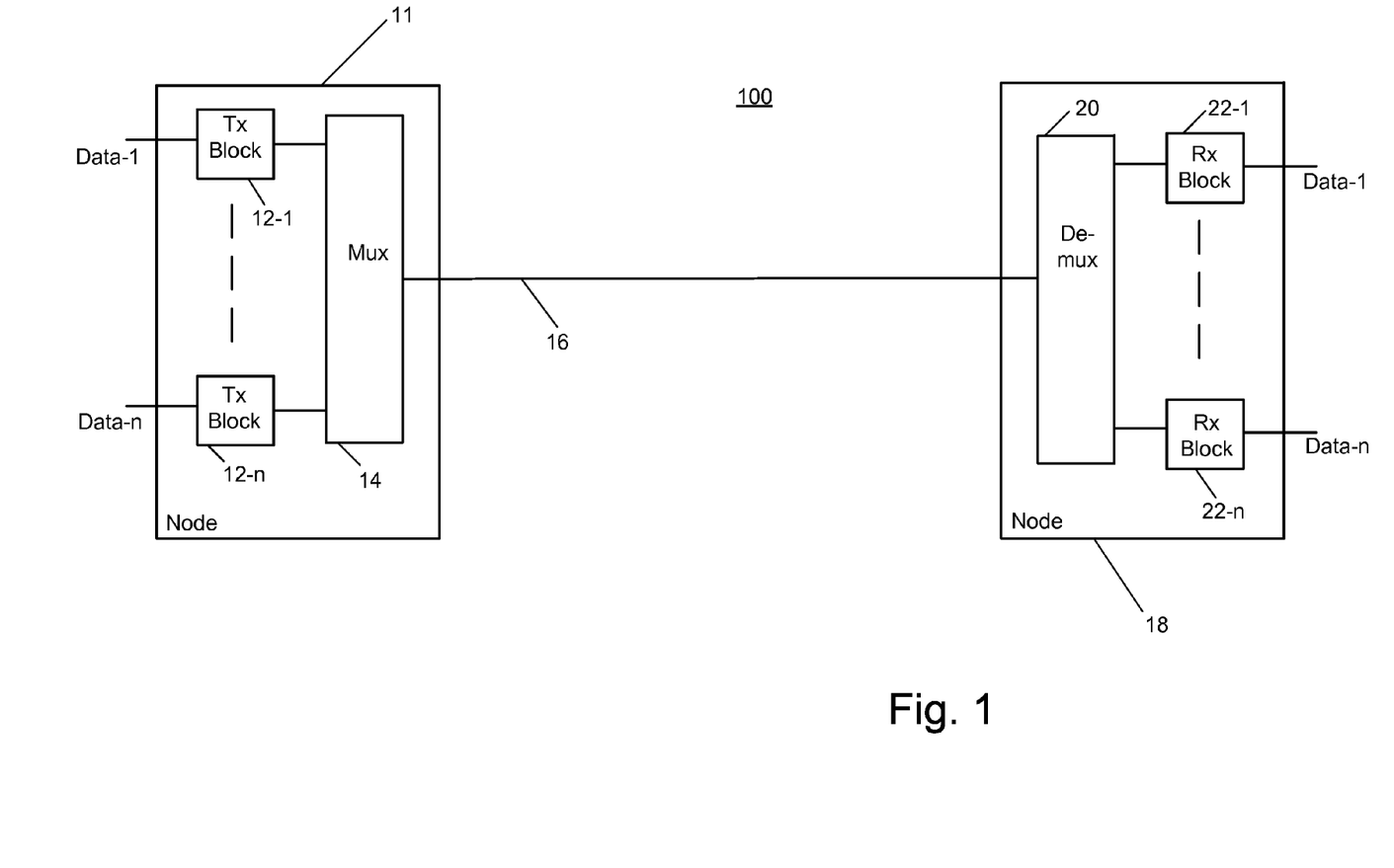
FIG. 1 illustrates a block diagram of an optical communication system consistent with the present disclosure.

FIG. 1 illustrates an optical link or optical communication system 100 consistent with an aspect of the present disclosure. Optical communication system 100 includes a plurality of transmitter blocks (Tx Block) 12-1 to 12-n provided in a transmit node 11. Each of transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or channels to a combiner or multiplexer 14. Each optical signal carries an information stream or data corresponding to each of data streams Data-1 to Data-n. Multiplexer 14, which may include one or more optical filters, for example, combines each of group of optical signals into a wavelength division multiplexed (WDM) that is output onto optical communication path 16. Optical communication path 16 may include one or more segments of optical fiber and optical amplifiers, for example, to optically amplify or boost the power of the transmitted optical signals.

As further shown in FIG. 1, a receive node 18 is provided that includes an optical combiner or demultiplexer 20, which may include one or more optical filters, for example, optical demultiplexer 20 supplies each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 2:
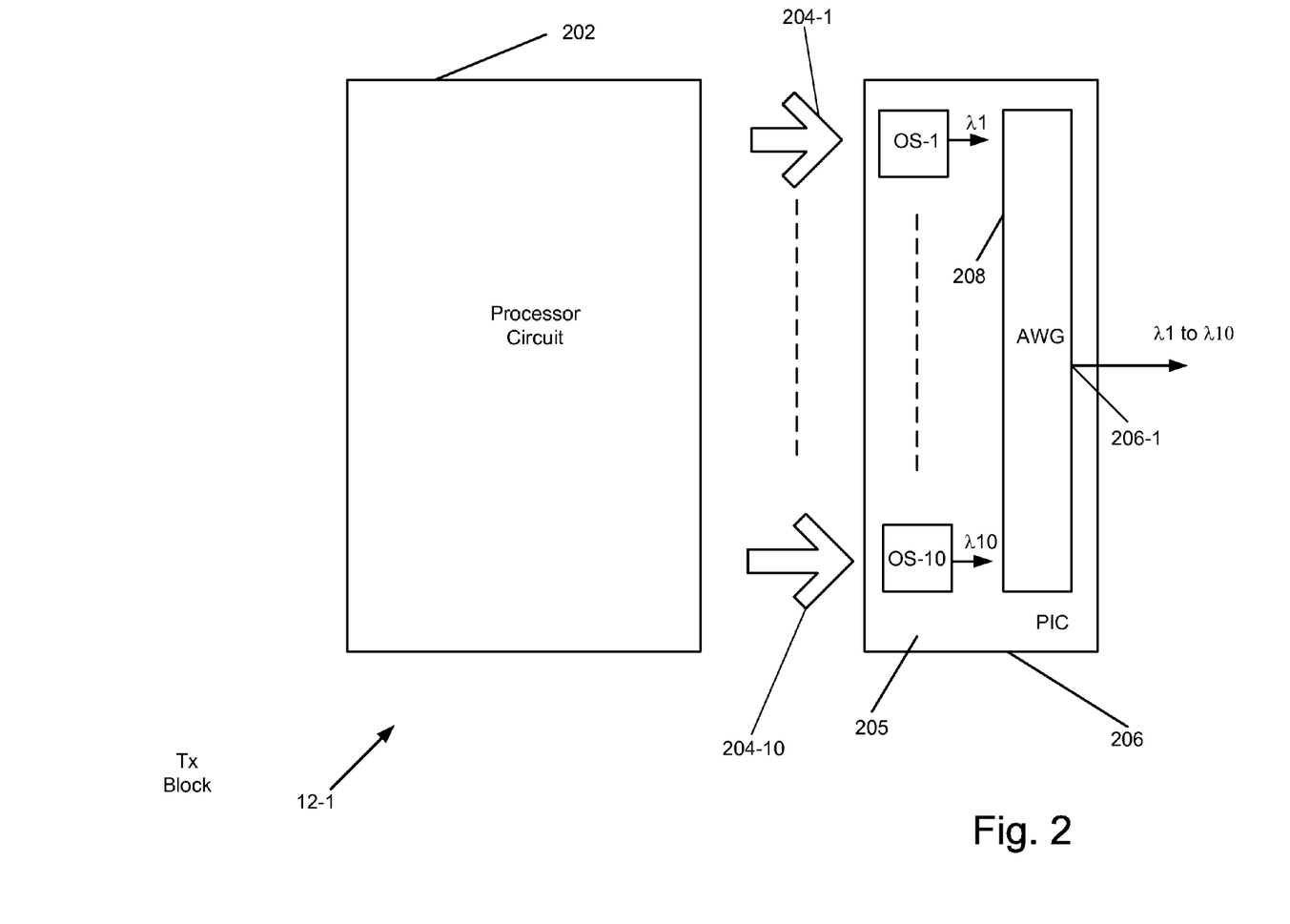
FIG. 2 illustrates a block diagram of a transmit node included in the optical communication system shown in FIG. 1.

FIG. 2 illustrates one of transmitter blocks 12-1 in greater detail. Transmitter block 12-1 may include known processor circuitry 202, such as a digital signal processor (DSP) and/or application specific integrated circuitry to provide appropriate drive signals 204-1 to 204-10 to optical sources or transmitters OS-1 to OS-2 provided on transmit photonic integrated circuit (PIC) 205 provided on substrate 206. As further shown in FIG. 2, each of optical sources OS-1 to OS-2 supplies a corresponding one of modulated optical signals having wavelengths $\lambda 1$ to $\lambda 10$, respectively. Wavelengths $\lambda 1$ to $\lambda 10$ may be in a C-band, for example. Each wavelength is spectrally separated or spaced from an adjacent wavelength by a wavelength spacing. In one example, each wavelength has a corresponding frequency and the spacing between adjacent frequencies (frequency spacing) is 25 GHz. The optical signals are combined by an optical combiner or multiplexer, such as arrayed waveguide grating (AWG) 208, for example, and combined into a band or group of optical signals supplied by output 206-1. Substrate 206 may include indium phosphide or other semiconductor materials. AWG 208 will be discussed in greater detail below with reference to FIGS. 4-8.

Although FIG. 2 illustrates and ten optical sources OS1-1 to OS-10, it is understood that any appropriate number of such circuit blocks and optical sources may be provided. Moreover, it is understood, that optical sources OS-1 to OS-10, as well as multiplexer 208, may be provided as discrete components, as opposed to being integrated onto substrate 206 as PIC 205. Alternatively, selected components may be provided on a first substrate while others may be provided on one or more additional substrates in a hybrid scheme in which the components are neither integrated onto one substrate nor provided as discrete devices.

As noted above, optical signals output from transmitter block 12-1 are combined with optical signals output from remaining transmitter blocks 12-2 to 12-n onto optical communication path 16 and transmitted to receive node 18 (see FIG. 1). In receive node 18, demultiplexer 20 divides the incoming signals into optical signal groupings, such that each grouping is fed to a corresponding one of receiver blocks 22-1 to 22-n.

Figure 3:
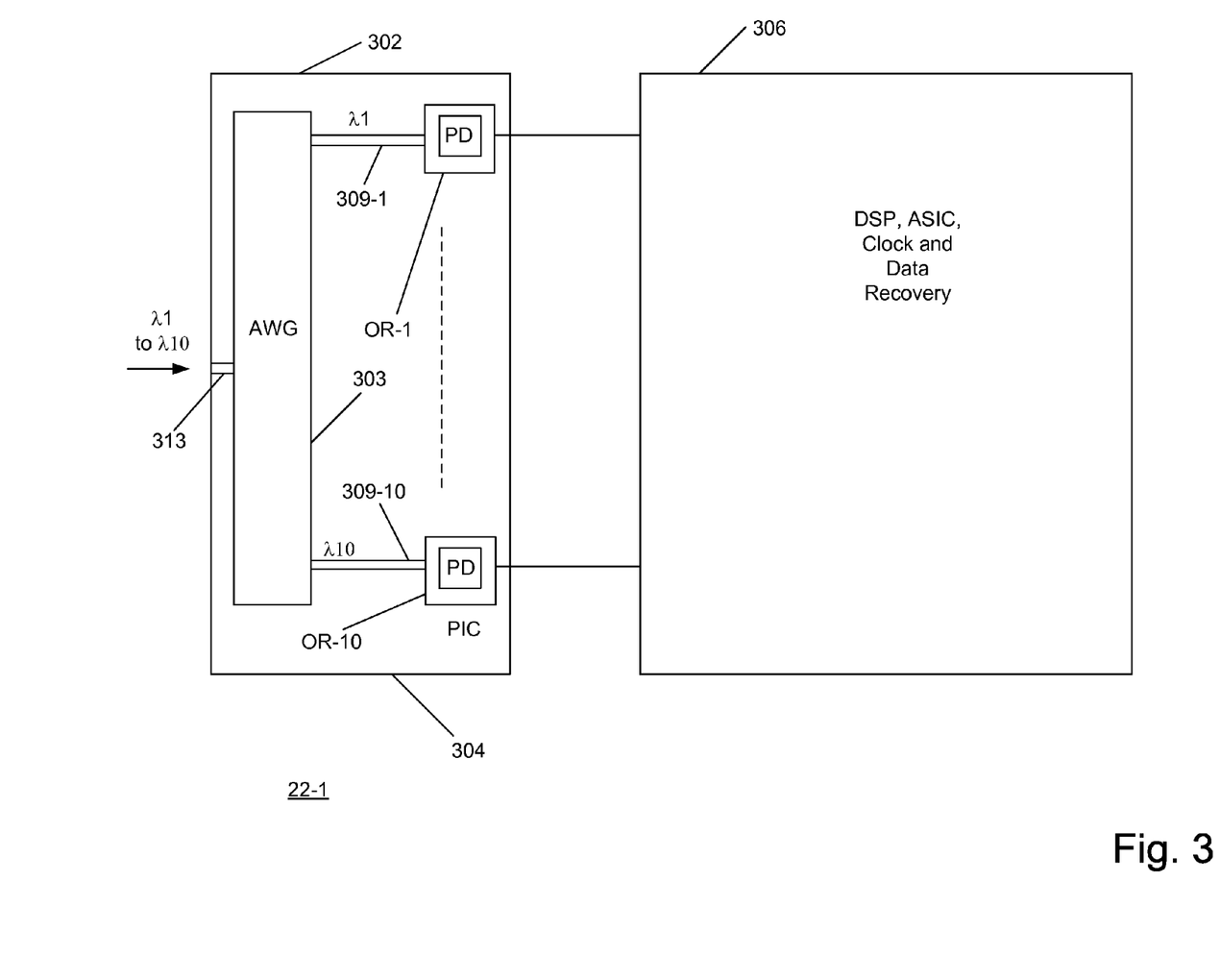
FIG. 3 illustrates a block diagram of a receive node included in the optical communication system shown in FIG. 2.

One of receiver blocks 22-1 is shown in greater detail in FIG. 3. It is understood that remaining receiver circuitry or blocks 22-2 to 22-n have the same or similar structure as receiver block 22-1.

Receiver block 22-1 includes a receive PIC 302 provided on substrate 304, which may also include indium phosphide (InP) or another semiconductor material. PIC 302 may include an AWG 303 that receives optical signals having wavelengths $\lambda 1$ to $\lambda 10$, for example, via input waveguide 313. AWG 303 further supplies each optical signal, via a corresponding one of output waveguides 309-1 to 309-10, to a corresponding one of optical receivers photodiodes (PD) included in a respective one of receivers OR-1 to OR-10. Each optical receiver OR-1 to OR-10, in turn, supplies a corresponding output to circuitry 306. Circuitry 306 may include a digital signal processor (DSP) and/or other known circuitry that performs clock and data recovery and forward error correction (FEC), for example, to output data carried by each optical signal.

Figure 4:
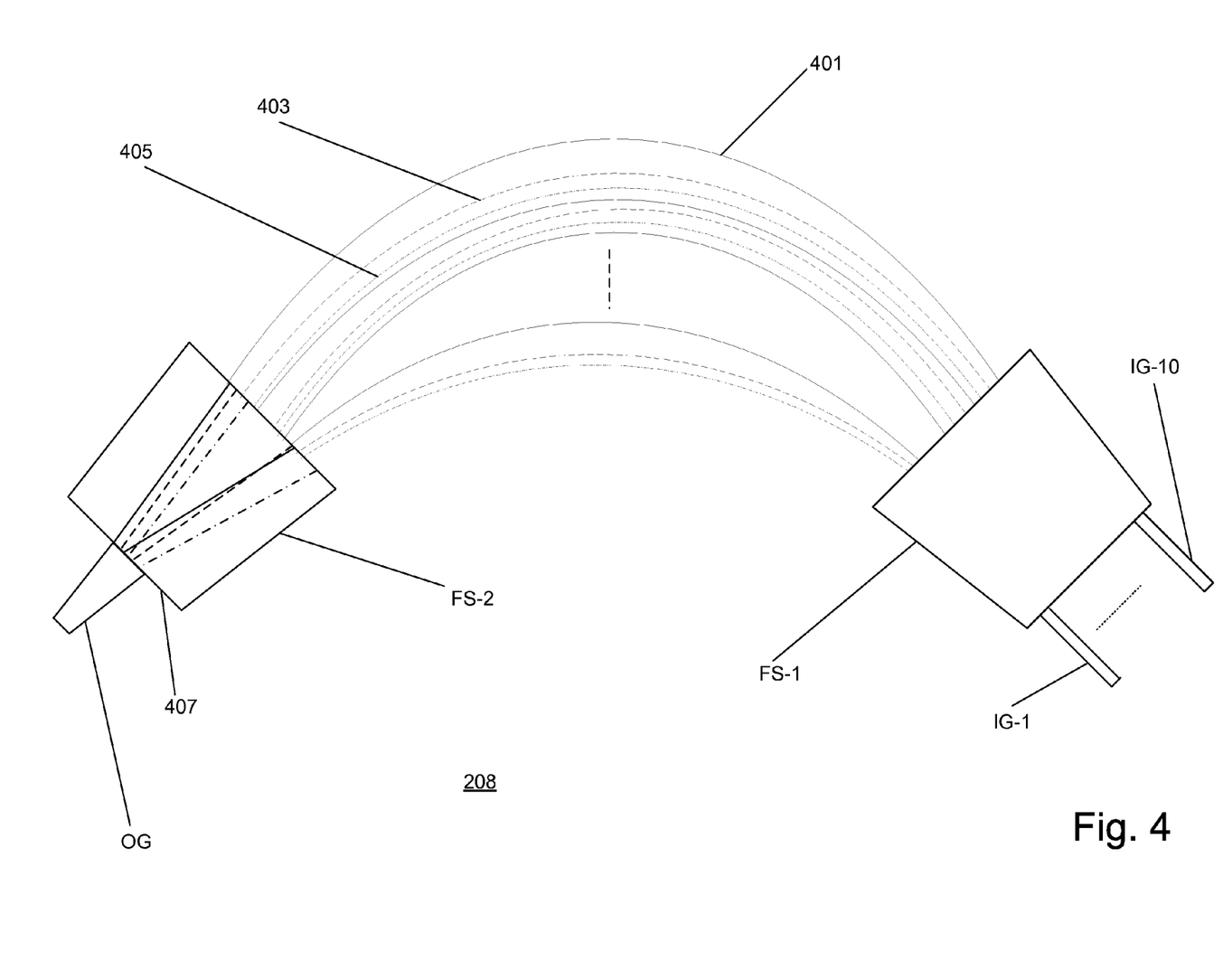
FIG. 4 illustrates an example of arrayed waveguide grating (AWG) consistent with an aspect of the present disclosure.
Figure 5:
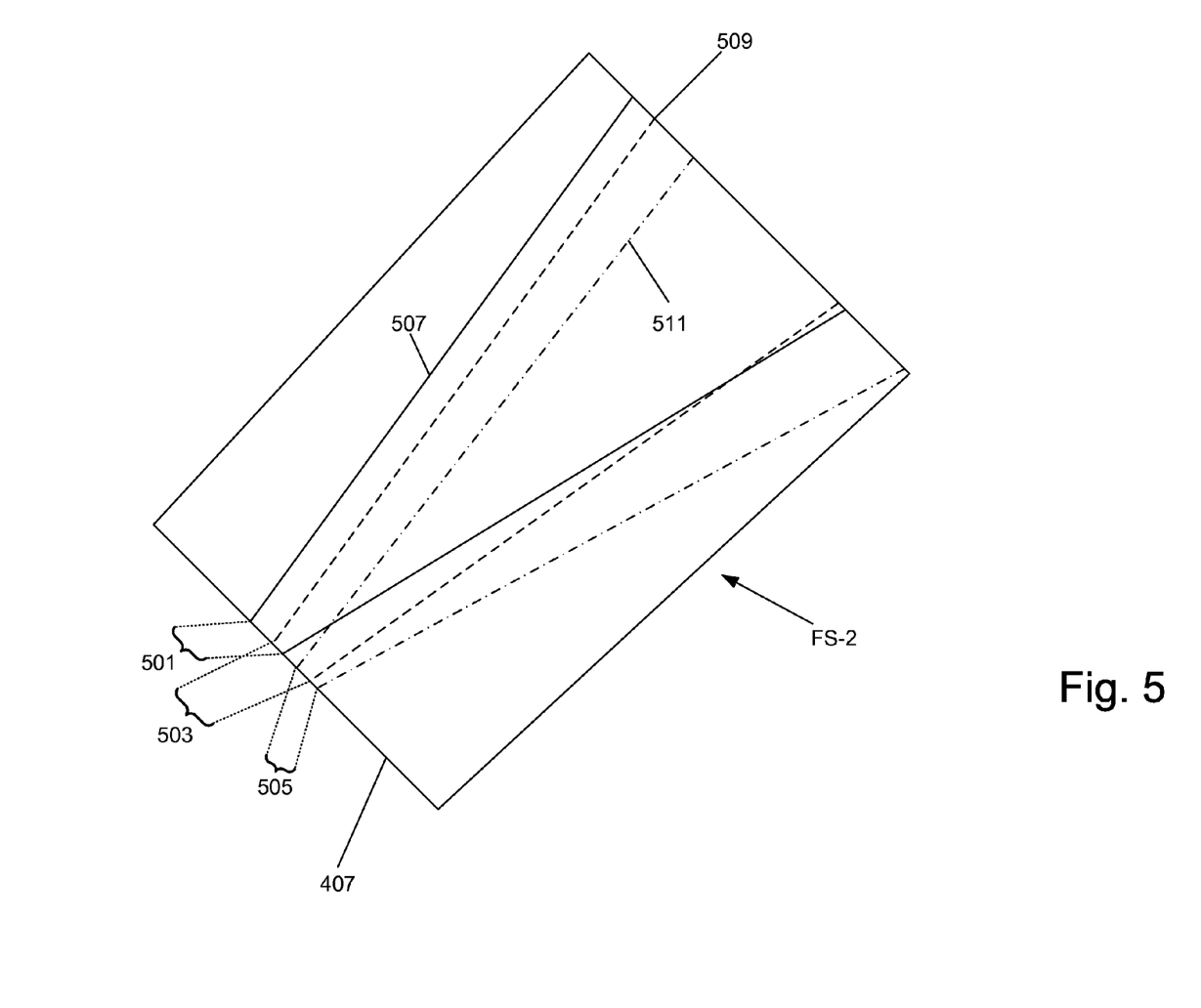
FIG. 5 illustrates an enlarged view of a free space region included in the AWG shown in FIG. 4.

As noted above in connection with FIG. 2, AWG 208 receives optical signals from each of optical sources OS-1 to OS-10 and combines the optical signals for transmission to receive node 18. FIG. 4 illustrates AWG 208 in greater detail, and FIG. 5 illustrates an enlarged view of a portion of AWG 208. With reference to FIG. 4, AWG 208 has first (FS-1) and second (FS-2) free space regions and a plurality of input waveguides, IG-1 to IG-10, that receive a corresponding one of the optical signals output from optical sources OS-1 to OS-10, respectively. Waveguides IG-1 to IG-10 supply a corresponding one of optical signals having wavelengths $\lambda 1$ to $\lambda 10$ to first free space region FS-1.

As further shown in FIG. 4, AWG 208 further includes a first plurality or grouping of waveguides 401 (represented by solid lines in FIG. 4) that extend from first free space region FS-1 to second free space region FS-2. Each of the first plurality of grating waveguides 401 has a corresponding one of a plurality of first lengths L1, L2, L3 . . . Ln, where n is a number of the first plurality of waveguides, $\Delta L$ being a difference between first and second successive ones of the plurality of first lengths. Free space regions FS-1 and FS-2 and the first plurality of grating waveguides 401 are configured so that a portion of light 507 received by free space region FS-2 (and transmitted through free space region FS-1 via waveguides 401) may be imaged or projected onto a part or region 501 of edge portion 407 of free space region FS-2 (see FIG. 5, which shows an enlarged view of free space region FS-2).

In addition, AWG 208 includes a second plurality or grouping of waveguides 403 (represented by dashed lines in FIG. 4) that extend from first free space region FS-1 to second free space region FS-2. Each of the second plurality of grating waveguides 403 has a corresponding one of a plurality of first lengths L1', L2', L3' . . . Lm, where m is a number of the first plurality of waveguides, $\Delta L'$ being a difference between first and second successive ones of the plurality of first lengths. Free space regions FS-1 and FS-2 and the second plurality of grating waveguides 403 are configured so that a portion of light 509 received by free space region FS-2 (and transmitted through free space region FS-1 via waveguides 403) may be imaged or projected onto a part or region 503 of edge portion 407 of free space region FS-2 (see FIG. 5).

Further, AWG 208 may include a third plurality or grouping of waveguides 405 (represented by dashed-dot lines in FIG. 4) that extend from first free space region FS-1 to second free space region FS-2. Each of the third plurality of grating waveguides 405 has a corresponding one of a plurality of first lengths L1", L2", L3" . . . Lp, where p is a number of the first plurality of waveguides, $\Delta L"$ being a difference between first and second successive ones of the plurality of first lengths. Free space regions FS-1 and FS-2 and the third plurality of grating waveguides 405 are configured so that a portion of light 511 received by free space region FS-2 (and transmitted through free space region FS-1 via waveguides 405) may be imaged or projected onto a part or region 505 of edge portion 407 of free space region FS-2 (see FIG. 5). Preferably, parts 501, 503, and 505 of edge portion 407 overlap one another.

Figure 6:
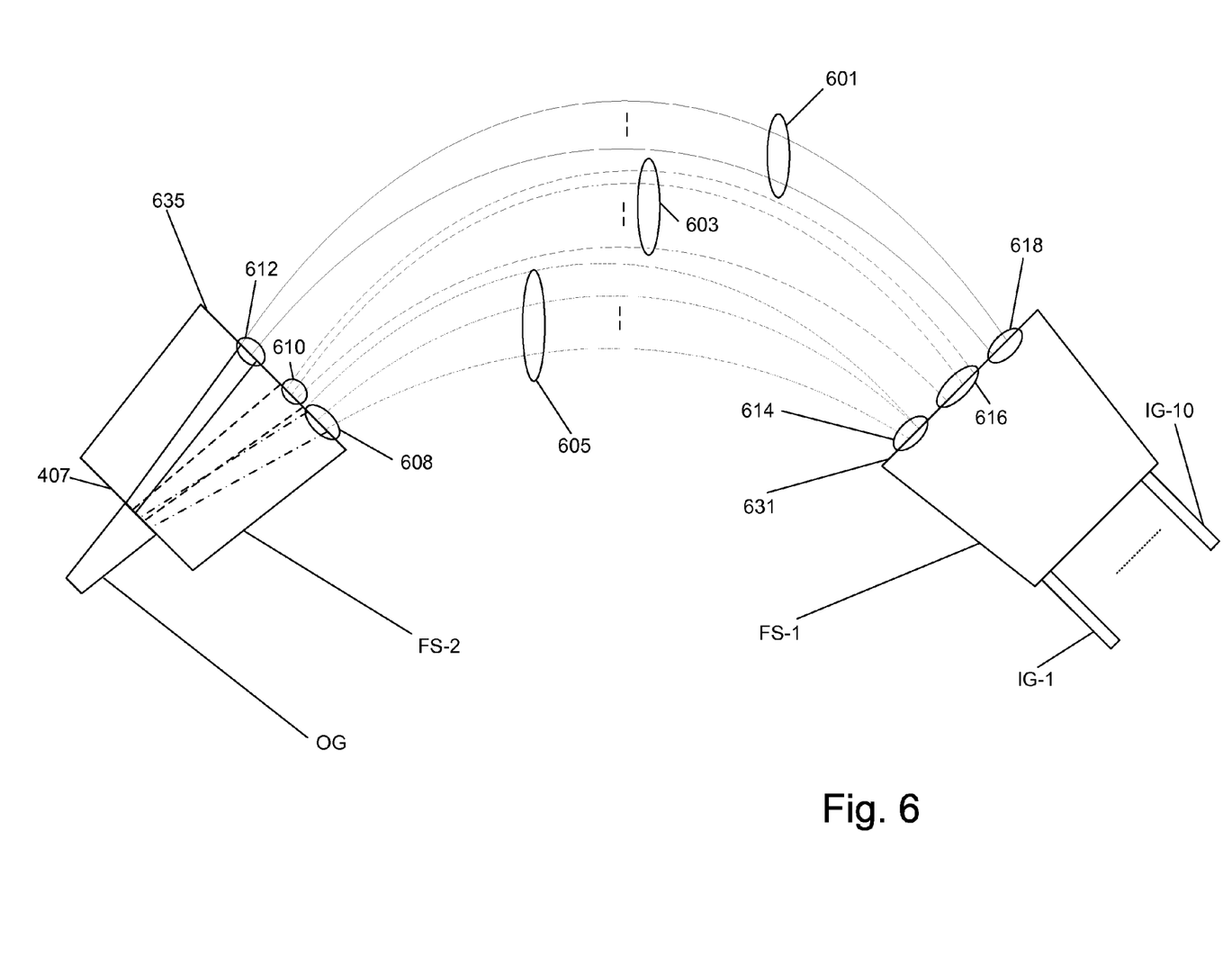
FIG. 6 illustrates an example of an AWG consistent with an additional aspect of the present disclosure.

In the example shown in FIG. 4, the grating waveguides associated with groupings 401, 403, and 405 are distributed or "interleaved" among each other, such that, for example, a waveguide associated with grouping 403 and a waveguide associated with grouping 405 may be provided between a pair of waveguides associated with grouping 401. In another example, as shown in FIG. 6, however, the waveguides associated with each grouping may be provided adjacent one another. In particular, a first plurality or grouping of grating waveguides 601 (represented by solid lines) may extend between a contiguous region 618 along edge or edge portion 631 of free space region FS-1 and a contiguous region 612 along edge or edge portion 635 of free space region FS-2. In addition, a second plurality or grouping of grating waveguides 603 (represented by dashed lines) may be provided that extend between contiguous region 616 of edge portion 631 and contiguous region 610 of edge portion 635, and a third plurality of grouping of grating waveguides 605 may be provided that extend between contiguous region 614 of edge portion 631 and contiguous region 608 of edge portion 635.

Figure 7:
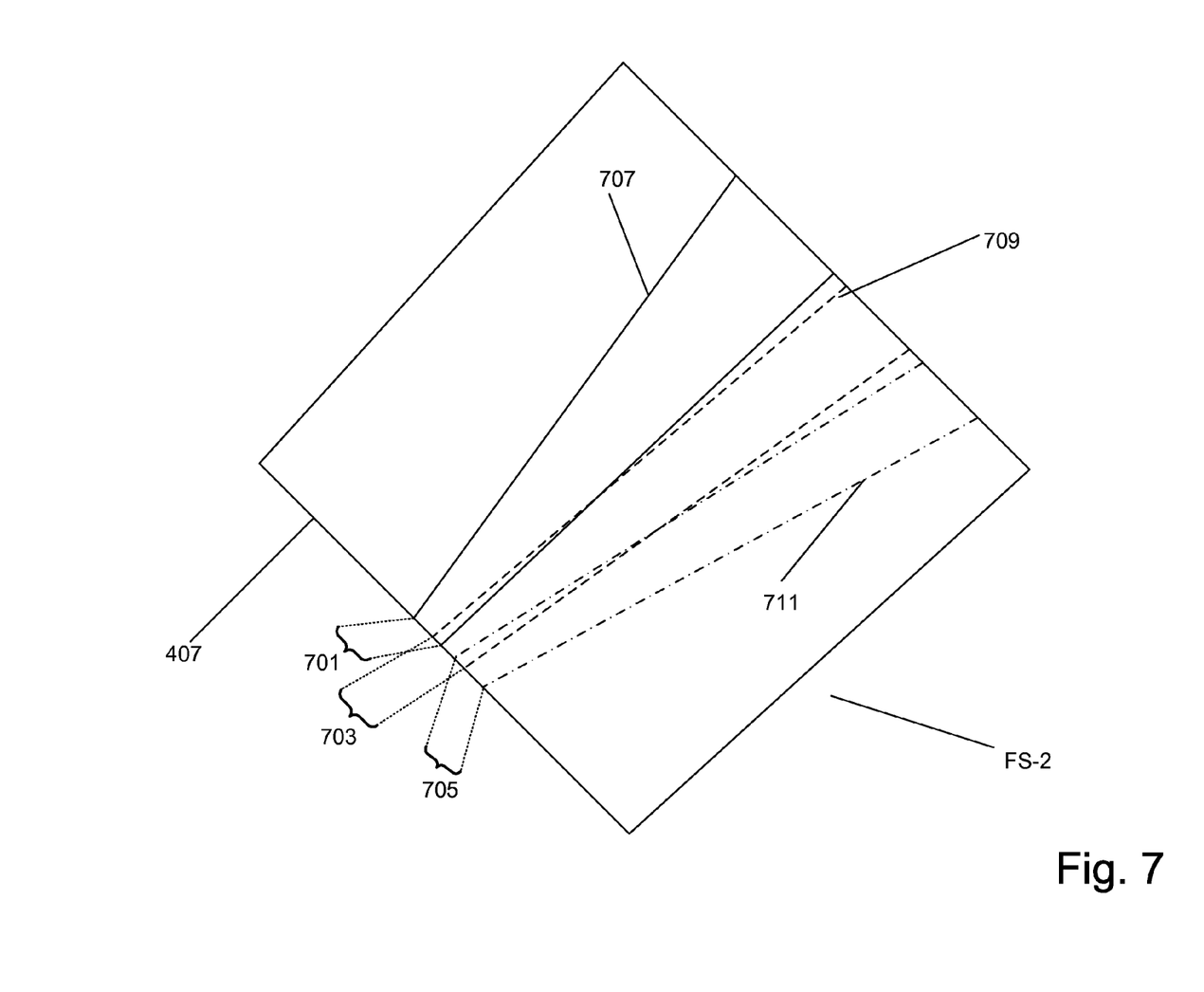
FIG. 7 illustrates an enlarged view of a free space region included in the AWG shown in FIG. 6.

As in FIG. 6, each of the grating waveguides in grouping 601 may have, for example, a corresponding one of a plurality of first lengths L1, L2, L3 . . . Ln, where n is a number of the first plurality of waveguides, $\Delta L$ being a difference between first and second successive ones of the plurality of first lengths. Free space regions FS-1 and FS-2 and the first plurality of grating waveguides 601 are configured so that a portion of light 707 received by free space region FS-2 (and transmitted through free space region FS-1 via waveguides 601) may be imaged or projected onto a part or region 701 of edge portion 407 of free space region FS-2 (see FIG. 7, which shows an enlarged view of free space region FS-2).

In addition, each of the second plurality of grating waveguides 603 may have, for example, a corresponding one of a plurality of first lengths L1', L2', L3' . . . Lm, where m is a number of the first plurality of waveguides, ΔL' being a difference between first and second successive ones of the plurality of first lengths. Free space regions FS-1 and FS-2 and the second plurality of grating waveguides 603 are configured so that a portion of light 709 received by free space region FS-2 (and transmitted through free space region FS-1 via waveguides 603) may be imaged or projected onto a part or region 703 of edge portion 407 of free space region FS-2 (see FIG. 5).

Further, each of the third plurality of grating waveguides 605 has a corresponding one of a plurality of first lengths L1", L2", L3" . . . Lp, where p is a number of the first plurality of waveguides, ΔL" being a difference between first and second successive ones of the plurality of first lengths. Free space regions FS-1 and FS-2 and the third plurality of grating waveguides 605 are configured so that a portion of light 711 received by free space region FS-2 (and transmitted through free space region FS-1 via waveguides 605) may be imaged or projected onto a part 705 of edge portion 407 of free space region FS-2 (see FIG. 5). Preferably, regions 701, 703, and 705 of edge portion 407 overlap one another.

Figure 8A:
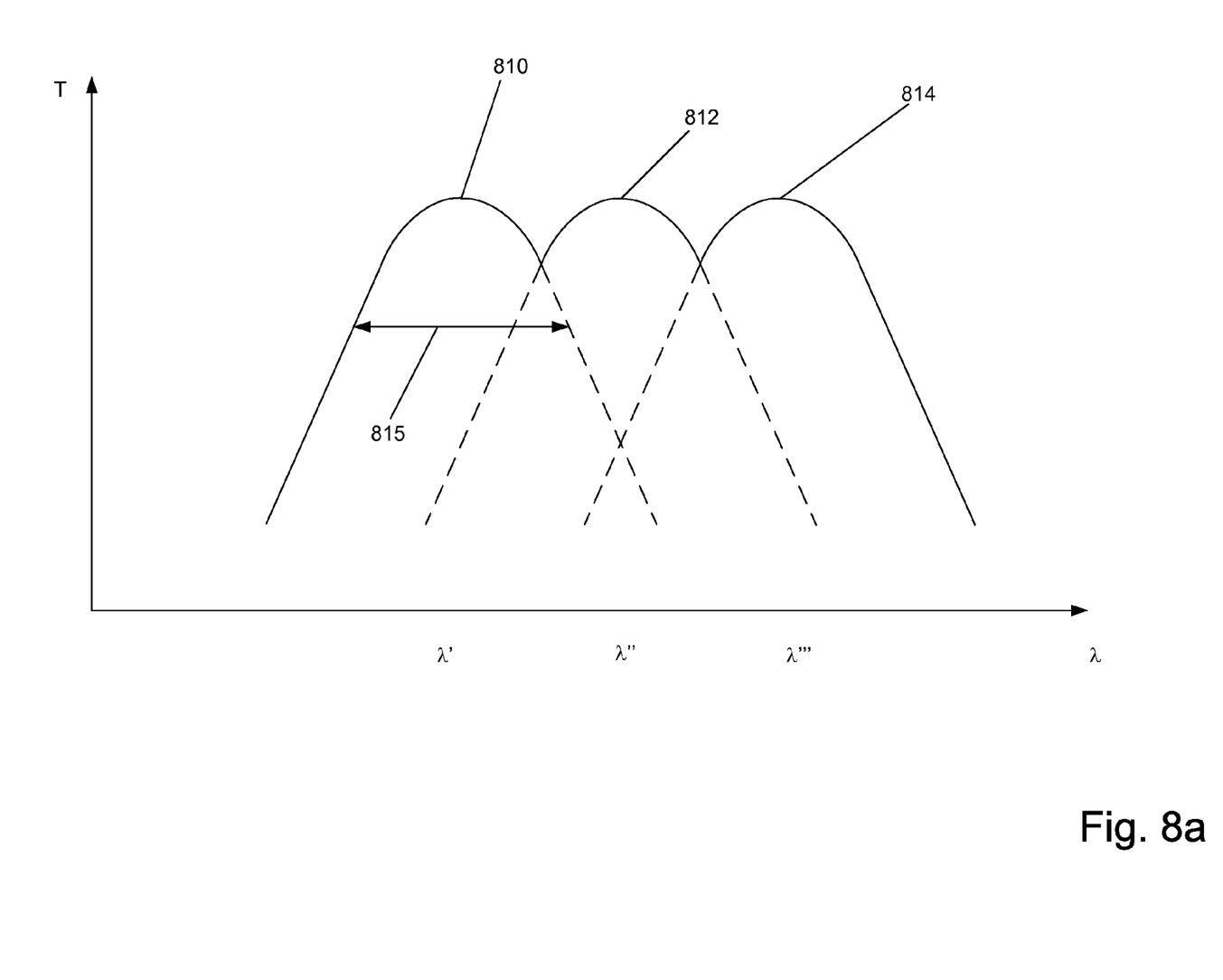
FIG. 8 illustrates an example of a transmission spectra associated with respective waveguide groupings of an AWG consistent with an aspect of the present disclosure.

In the examples shown in FIGS. 4 and 6, ΔL, ΔL', and ΔL" are preferably different from each other and are not integer multiples of each other so that each grating waveguide grouping has a corresponding transmission spectrum. For example, as shown in FIG. 8a, transmission spectrum 810 may be associated with the first waveguide grating grouping (e.g., grouping 401 in FIG. 4 or 601 in FIG. 6) and may have a peak transmission at wavelength (center wavelength) $\lambda$'; transmission spectrum 812 may be associated with the second waveguide grating grouping (e.g., grouping 403 in FIG. 4 or 603 in FIG. 6) and may have a peak transmission at wavelength (center wavelength) $\lambda$"; and transmission spectrum 814 may be associated with the second waveguide grating grouping (e.g., grouping 405 in FIG. 4 or 605 in FIG. 6) and may have a peak transmission at wavelength (center wavelength) $\lambda$'". Preferably, center wavelengths $\lambda$', $\lambda$", and $\lambda$'" are relatively close to one another. In addition, the spacing between wavelengths (wavelength spacing) $\lambda$' and $\lambda$", and the spacing between wavelengths $\lambda$" and $\lambda$'" is less than the wavelength spacing associated with optical signals output from sources OS-1 to OS-10.

Figure 8B:
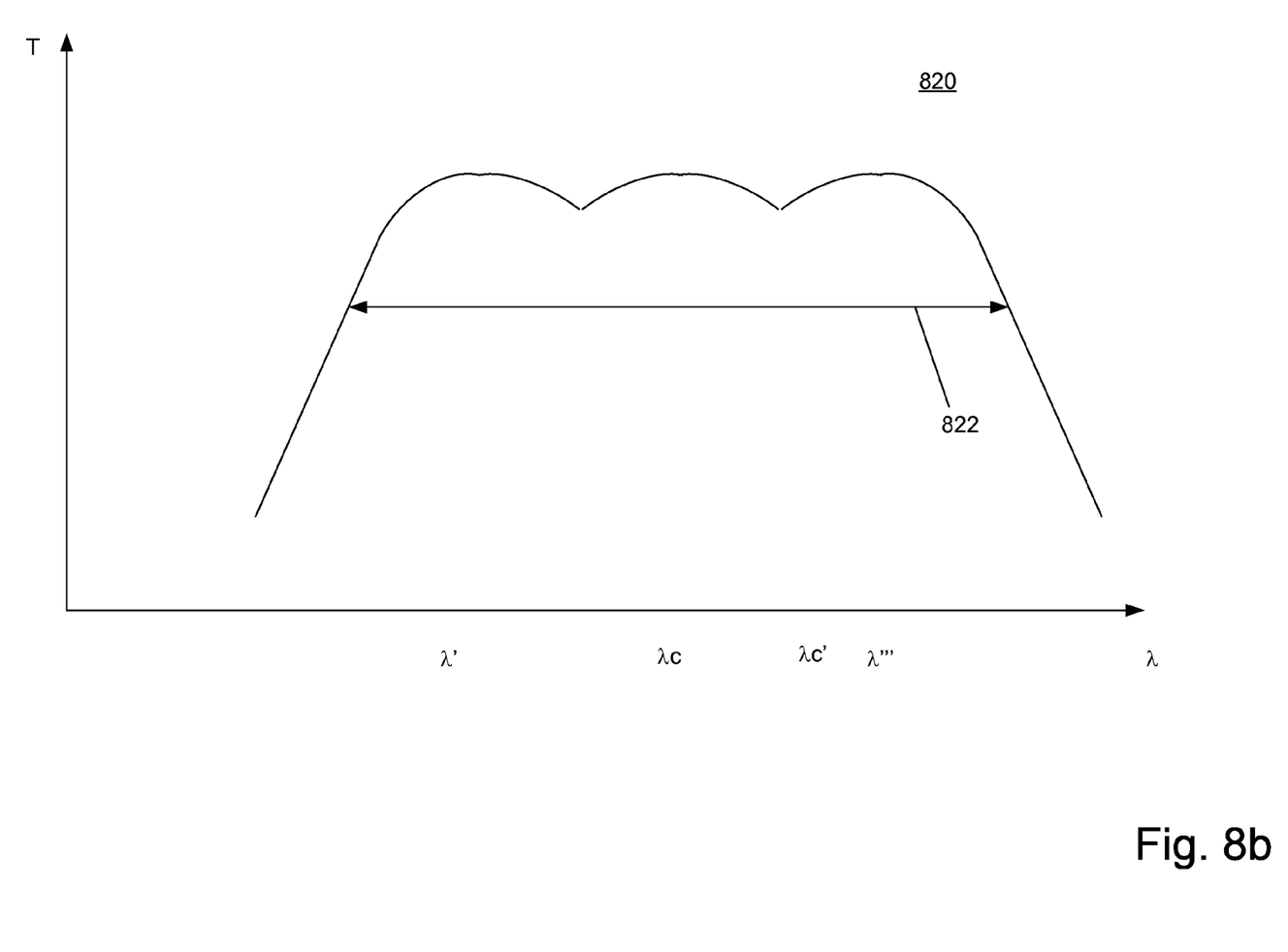

Each of transmission spectra 810, 812, and 814 has a relatively narrow passband, such as, for example, passband 815 associated with spectrum 810. However, spectra 810, 812, and 814 combine, such that AWG 208 has a transmission spectrum 820 shown in FIG. 8b. Spectrum 820 has a relatively wide passband 822, such that optical signals passing through AWG 208 having wavelengths that are spectrally offset from passband center wavelength $\lambda$c may be incur relatively little loss. For example, as further shown in FIG. 8b, optical signals at $\lambda$c' are within passband 822 and have an associated transmission that is relatively high.

Figure 9:
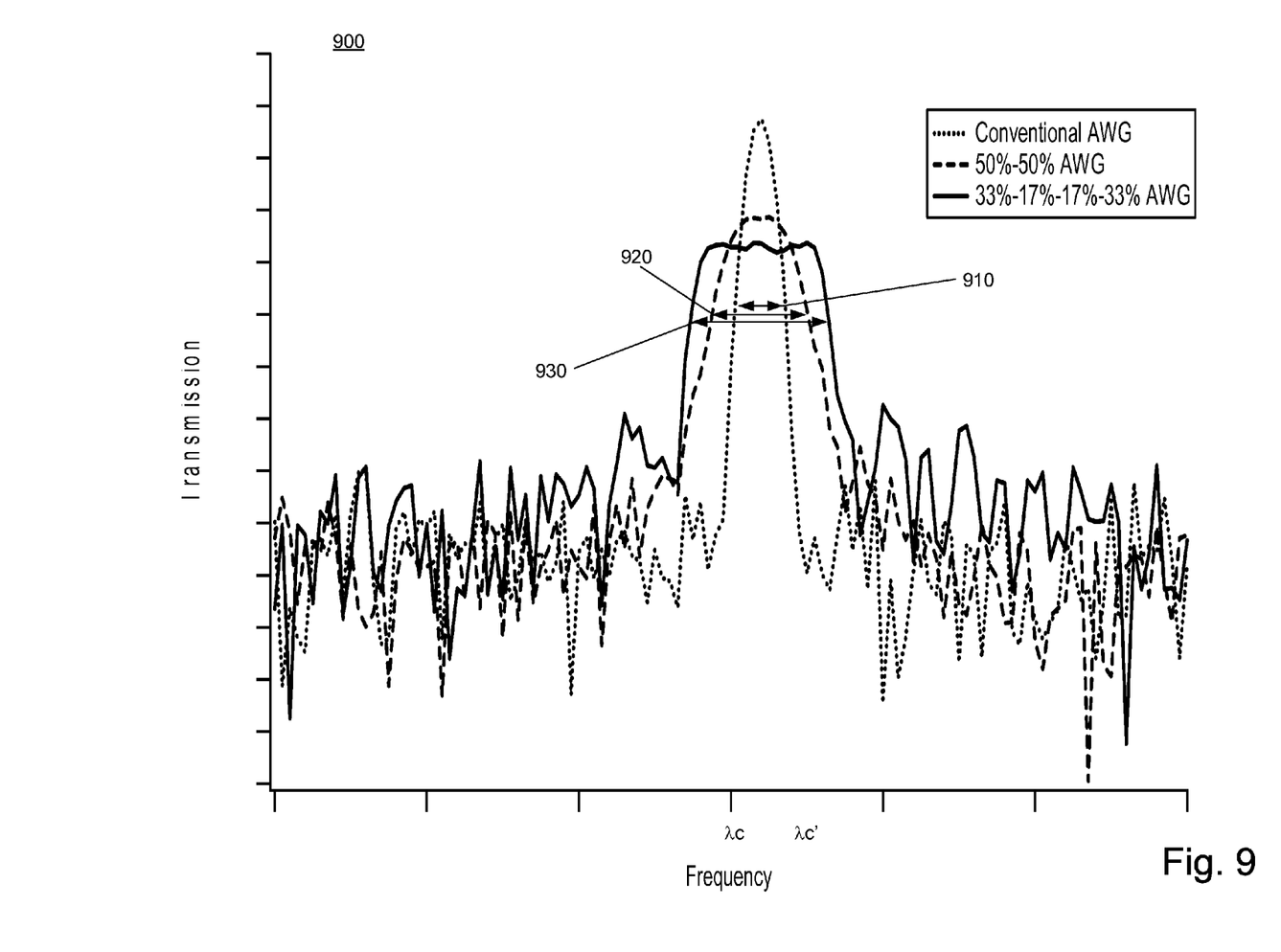
FIG. 9 illustrates an example of a transmission spectrum consistent with the present disclosure.

FIG. 9 illustrates a composite transmission spectrum 900 including a transmission spectrum 910 or characteristic associated with an example of a conventional AWG; transmission spectrum 920 associated with an AWG having two non-interleaved grating waveguide groupings ("50%-50% AWG") consistent with the present disclosure, and transmission spectrum 930 associated with an AWG having four non-interleaved waveguide groupings ("33%-17%-17%-33% AWG") consistent with a further aspect of the present disclosure. That is, in this example, a third of the gratings have a first ΔL, an additional third of the gratings of a second ΔL, 17% of the gratings have a third ΔL, and another 17% of the gratings have a fourth ΔL.

As further shown in FIG. 9, optical signals at wavelength $\lambda$c are within passbands 910, 920, and 930 of the conventional and may thus be transmitted with little loss. On the other hand, optical signals having wavelength $\lambda$c' that differ slightly from wavelength $\lambda$c incur substantial loss with the conventional AWG. However, such signals may have less loss when propagating through the AWG having two waveguide groupings (spectrum 920), and have even further reduced loss in an AWG having four waveguide groupings (spectrum 930). Thus, as shown in FIG. 9. AWG passbands may be made wider by providing more grating waveguide groupings. In addition, it has been observed that increasing the number of grating waveguide groupings or providing non-interleaved grating waveguide groupings can reduce cross-talk associated with the AWG.

Thus, optical signals output from optical sources OS-1 to OS-10 need not be at precise wavelengths in order to be multiplexed by AWG 208 with little loss. Rather, as noted above, AWG 208, consistent with the present disclosure, has a relatively wide passband and can multiplex optical signals with low loss over a relatively wide range or band of wavelengths about a center wavelength. Moreover, since each waveguide grouping images a portion of the received light onto a different part of free space region FS-2 (e.g., parts 501, 503, and 505 in FIG. 5), more light can be fed from imaged portions of free space region FS-2 to output waveguide OG, especially if output waveguide OG is made relatively wide adjacent edge 407. Preferably, in order to increase the amount of light passing from free space region FS-2 to output waveguide OG, the imaged portion should overlap with a field, such as a Gaussian or mode field of output waveguide OG.

It is understood that AWG 303 in receive block 22-1 shown in FIG. 3 may have the same or similar structure as AWG 208. AWG 303, however, operates to demultiplex received optical signals, while AWG 208 is an optical multiplexer.

In addition, any appropriate number of grating waveguides groupings may be provided and any appropriate number of waveguides may be provided in each grouping. In addition, it is understood that output waveguide OG shown in FIGS. 4 and 6 should preferably be relatively wide adjacent edge 407 of free space region FS-2, and, for example, have a width wider than that of input waveguides IG-1 to IG-10. In one example, the width may be 3.7 microns, and the input waveguides may each have a width of 3.15 microns. In another example, the width of output waveguide OG adjacent edge 407 may be 7.5 microns, and the width of each input waveguide IG-1 to IG-10 may be 3.15 microns.

Other embodiments will be apparent to those skilled in the art from consideration of the specification. It is intended that the specification and examples be considered as exemplary only, with a true scope and spirit of the invention being indicated by the following claims.

What is claimed is:

1. An arrayed waveguide grating, comprising:
 a first free space region and a second free space region spaced from the first free space region, the first free space region being configured to receive light having a wavelength, the second free space region having an edge portion;
 a first plurality of waveguides extending from the first free space region to the second free space region, each of the first plurality of waveguides having a corresponding one of a plurality of first lengths L1, L2, L3 ... Ln, where n is a number of the first plurality of waveguides, ΔL being a difference in length between successive ones of the first plurality of waveguides;

a second plurality of waveguides extending from the first free space region to the second free space region, each of the second plurality of waveguides having a corresponding one of a plurality of second lengths L1', L2', L3' ... Lm', where m is a number of the second plurality of waveguides, ΔL' being a difference in length between successive ones of the second plurality of waveguides; and a third plurality of waveguides extending from the first free space region to the second free space region, each of the third plurality of waveguides having a corresponding one of a plurality of third lengths L1", L2", L3" ... Lp", where p is a number of the third plurality of waveguides, ΔL" being a difference in length between successive ones of the third plurality of waveguides, wherein the first plurality of waveguides and the first and second free space regions being configured such that a first portion of the light is projected on a first part of the edge portion of the second free space region, the second plurality of waveguides and the first and second free space regions being configured such that a second portion of the light is projected onto a second part of the edge portion, and the third plurality of waveguides and the first and second free space regions being configured such that a third portion of the light is projected onto a third part of the edge portion, the first, second, and third parts of the edge portion overlapping one another, and wherein ΔL, ΔL', and ΔL" are not integer multiples of each other.

2. An arrayed waveguide grating in accordance with claim 1, wherein the first and second free space regions constitute first and second slab waveguides, respectively.

3. An arrayed waveguide grating in accordance with claim 1, wherein the edge portion of the second free space region is a first edge portion of the second free space region, the first free space region having an edge portion, such that each of the first plurality of waveguides extend from a first part of the edge portion of the first free space region to a first part of the second edge portion of the second free space region, each of the second plurality of waveguides extends from a second part of the edge portion of the first free space region to a second part of the second edge portion of the second free space region, each of the third plurality of waveguides extends from a third part of the edge portion of the first free space region to a third part of the second edge portion of the second free space region.

4. An arrayed waveguide grating in accordance with claim 1, wherein each of the first plurality of waveguides and each of the third plurality of waveguides is provided between a corresponding one of a plurality of pairs of the second plurality of waveguides.

5. An arrayed waveguide grating in accordance with claim 1, wherein each of the plurality of wavelengths has a corresponding one of a plurality of frequencies separated from one another by a frequency spacing, the frequency spacing being substantially equal to 25 GHz.

6. An apparatus, comprising:

an input waveguide configured to carry a plurality of optical signals, each of which having a corresponding one of a plurality of wavelengths, each of the plurality of wavelengths being spectrally spaced from one another by a wavelength spacing;

a first free space region and a second free space region that is spaced from the first free space region, the first free space region being configured to receive the plurality of optical signals;

a first plurality of grating waveguides extending from the first free space region to the second free space region, ΔL being a difference in length between successive ones of the first plurality of grating waveguides;

a second plurality of grating waveguides extending from the first free space region to the second free space region, ΔL' being a difference in length between successive ones of the second plurality of grating waveguides;

a third plurality of grating waveguides extending from the first free space region to the second free space region, ΔL" being a difference in length between successive ones of the third plurality of grating waveguides; and a plurality of output waveguides, each of which providing a corresponding one of the plurality of optical signals, each of the plurality of output waveguides extending from a corresponding one of a plurality of portions of an edge portion of the second free space region, the first, second and third pluralities of grating waveguides being associated with first, second, and third transmission maxima, respectively, the first, second, and third transmission maximum being at first, second, and third wavelengths, respectively, the first and second wavelengths being spaced from each other by a first spectral distance and the second and third wavelengths being spaced from each other by a second spectral distance, the first and second spectral distances being less than the wavelength spacing, wherein ΔL, ΔL', and ΔL" are not integer multiples of each other.

7. An arrayed waveguide grating in accordance with claim 6, wherein the edge portion of the second free space region is a first edge portion of the second free space region, the first free space region having an edge portion, such that each of the first plurality of waveguides extend from a first part of the edge portion of the first free space region to a first part of the second edge portion of the second free space region, each of the second plurality of waveguides extends from a second part of the edge portion of the first free space region to a second part of the second edge portion of the second free space region, each of the third plurality of waveguides extends from a third part of the edge portion of the first free space region to a third part of the second edge portion of the second free space region.

8. An arrayed waveguide grating in accordance with claim 6, wherein each of the first plurality of waveguides and each of the third plurality of waveguides is provided between a corresponding one of a plurality of pairs of the second plurality of waveguides.

9. An apparatus in accordance with claim 6, wherein the first and second free space regions include first and second slab waveguides, respectively.

10. An apparatus in accordance with claim 6, further including a substrate, the input waveguide, the first and second free space regions, and the plurality of output waveguides being provided on the substrate.

11. An apparatus in accordance with claim 10, further including a plurality of photodiodes provided on the substrate, each of the plurality of photodiodes receiving a corresponding one of the plurality of optical signals from a respective one of the plurality of output waveguides.

12. An apparatus in accordance with claim 6, further including a plurality of photodiodes, each of the plurality of photodiodes receiving a corresponding one of the plurality of optical signals from a respective one of the plurality of output waveguides.

13. An apparatus in accordance with claim 10, wherein the substrate includes indium phosphide.

14. An apparatus in accordance with claim 10, wherein each of the plurality of wavelengths has a corresponding one of a plurality of frequencies separated from one another by a frequency spacing, the frequency spacing being substantially equal to 25 GHz.

15. An apparatus, comprising:
a plurality of optical transmitters, each of which being configured to supply a corresponding one of a plurality of optical signals, each of the plurality of optical signals having a corresponding one of a plurality of wavelengths;
an arrayed waveguide grating including:
a first free space region and a second free space region spaced from the first free space region, the first free space region having an edge portion, the first free space region being configured to receive the plurality of optical signals, each of which having a corresponding one of a plurality of wavelengths;
a first plurality of grating waveguides extending from the first free space region to the second free space region, $\Delta L$ being a difference between first and second successive ones of the first plurality of grating waveguides;
a second plurality of grating waveguides extending from the first free space region to the second free space region, $\Delta L'$ being a difference in length between successive ones of the second plurality of grating waveguides;
a third plurality of grating waveguides extending from the first free space region to the second free space region, $\Delta L''$ being a difference in length between successive ones of the third plurality of grating waveguides the first, second, and third pluralities of grating waveguides being configured such that, if light is supplied to the second free space region, a first portion of the light is projected on a first part of the edge portion of the first free space region, the second plurality of waveguides and the first and second free space regions being configured such that a second portion of the light is projected onto a second part of the edge portion of the first free space region, and the third plurality of waveguides and the first and second free space regions being configured such that a third portion of the light is projected onto a second part of the edge portion of the first free space region, the first, second, and third parts of the edge portion overlapping one another to define an overlapping region, at least one of the plurality of optical signals being supplied to the first free space region via the overlapping region,
wherein $\Delta L$, $\Delta L'$, and $\Delta L''$ are not integer multiples of each other.

16. An apparatus in accordance with claim 15, wherein the second free space region outputs the plurality of optical signals within a wavelength division multiplexed (WDM) optical signal.

17. An apparatus in accordance with claim 15, further including a substrate, the plurality of optical transmitters, the first and second free space regions and the first, second, and third pluralities of grating waveguides being provided on the substrate.

18. An arrayed waveguide grating in accordance with claim 15, wherein the edge portion of the second free space region is a first edge portion of the second free space region, the first free space region having an edge portion, such that each of the first plurality of waveguides extend from a first part of the edge portion of the first free space region to a first part of the second edge portion of the second free space region, each of the second plurality of waveguides extends from a second part of the edge portion of the first free space region to a second part of the second edge portion of the second free space region, each of the third plurality of waveguides extends from a third part of the edge portion of the first free space region to a third part of the second edge portion of the second free space region.

19. An arrayed waveguide grating in accordance with claim 15, wherein each of the first plurality of waveguides and each of the third plurality of waveguides is provided between a corresponding one of a plurality of pairs of the second plurality of waveguides.

20. An arrayed waveguide grating in accordance with claim 15, wherein each of the plurality of wavelengths has a corresponding one of a plurality of frequencies separated from one another by a frequency spacing, the frequency spacing being substantially equal to 25 GHz.

21. An arrayed waveguide grating, comprising:
a first free space region and a second free space region spaced from the first free space region, the first free space region being configured to receive light having a wavelength, the second free space region having an edge portion;
a first plurality of waveguides extending from a first contiguous region of the first free space region to a first contiguous region of the second free space region, each of the first plurality of waveguides having a corresponding one of a plurality of first lengths L1, L2, L3 . . . Ln, where n is a number of the first plurality of waveguides, $\Delta L$ being a difference between first and second successive ones of the plurality of first lengths; and
a second plurality of waveguides extending from a second contiguous region of the first free space region to a second contiguous region of the second free space region, each of the second plurality of waveguides having a corresponding one of a plurality of second lengths L1', L2', L3' . . . Lm', where m is a number of the second plurality of waveguides, $\Delta L'$ being a difference between first and second successive ones of the plurality of second lengths,
wherein the first plurality of waveguides and the first and second free space regions being configured such that a first portion of the light is projected on a first part of the edge portion of the second free space region, and the second plurality of waveguides and the first and second free space regions being configured such that a second portion of the light is projected onto a second part of the edge portion, the first and second parts of the edge portion overlapping one another, and $\Delta L$ and $\Delta L'$ are not integer multiples of each other.

* * * * *